Patented Oct. 30, 1934

1,979,229

UNITED STATES PATENT OFFICE 1,979,229

REMOVING IMPURITIES FROM METALLURGICAL SOLUTIONS

Edgar C. Pitzer, Baltimore, Md., assignor to American Smelting and Refining Company, New York, N. Y., a corporation of New Jersey No Drawing. Application May 2, 1932, Serial No. 608,853

7 Claims. (Cl. 23—125)

This invention relates to the treatment of acid solutions commonly employed in metallurgical operations and provides a method for treating such solutions whereby the impurities contained therein are either greatly reduced in amount or entirely eliminated, depending on the particular impurities under consideration, the length of the time of treatment, the temperature at which the treatment is conducted, and the form and amount of the removal agent introduced into the solution, as well as various other factors.

It is well known in the art of metallurgy that leaching solutions, electro-winning electrolytes, and like solutions tend, with use, to become contaminated with impurities resulting in a decreased efficiency which in time necessitates discarding the solution if no provision is made for the removal of the objectionable impurities or their elimination to workable limits.

For example, in the electrolytic refining of copper, containing among other impurities, arsenic, antimony, selenium, tellurium, and iron, a large percentage of the arsenic and smaller percentages of antimony, iron, selenium, and tellurium, in the impure copper anodes enter the electrolyte. If these impurities are not confined within certain maximum limits the cathodes become impure and the purpose of the electrolysis is defeated. Similar difficulties present themselves in the practice of by-product leaching and in the use of electro-winning electrolytes. For example, it is common in the case of electro-winning electrolytes for iron sulphates to build up and cause a serious loss in power efficiency. This is generally attributed to iron sulphate dissolving the cathodes and after the iron content has reached a certain definite limit the solution must be discarded unless suitable means can be found for removing the impurities.

Various practices have, heretofore, been indulged in to overcome the detrimental effects of the impurities which build up in the solutions used in the various metallurgical processes. In many cases the practice is made of removing a portion of the electrolyte or leaching solution each day, the quantity removed depending upon the amount of the critical impurity or impurities present in the material undergoing treatment. In some refineries an attempt is made to remove the impurities to workable limits and return the solution to the process while in some cases no attempt is made to do this and those portions which are periodically withdrawn from the process are discarded.

Of the various impurities which occur in the various solutions, arsenic is one of the most common and also one whose removal is expensive and difficult. This is true because the electrodeposition of arsenic from acid is in itself a very inefficient process and, in addition, arsine, a very poisonous gas, is generated. On the other hand, the removal of arsenic by distillation is an objectionable and expensive process.

By my invention it is possible to economically remove such impurities as arsenic, antimony, selenium, tellurium and iron from acid solutions such as are commonly used in metallurgical operations. I am also able, in the case of many electrolytes or leaching solutions, to effect a selective reaction which results in the removal or reduction to workable limits of some impurities without removing other metallic values contained therein. My invention contemplates adding compounds of titanium, preferably titanium sulphate, in small amounts to the solution containing impurities, which results in the impurities being precipitated therefrom. In practicing the invention, I prefer to remove a portion of the electrolyte and add thereto a calculated amount of titanium sulphate. The solution is then agitated and allowed to stand until precipitation is complete, which is usually accomplished within a few hours. The precipitate is then filtered off or decanted from the solution and the solution returned to the circuit. The operation generally takes from three to eight hours and although I have obtained satisfactory results at room temperature it is preferable to practice the invention at slightly higher temperatures in order to obtain more rapid precipitation.

To more thoroughly illustrate how my invention functions the following specific example of my invention as practiced with a copper refining electrolyte is given. A portion of the electrolyte was withdrawn from the tank house and upon chemical analysis was found to contain the following:

| | | |
|---|---|---|
| Specific gravity | | 1.265 |
| $H_2SO_4$ | grams per liter | 190 |
| Copper | do | 45.9 |
| Nickel | do | 12.8 |
| Arsenic | do | 6.94 |
| Antimony | do | .50 |
| Iron | do | 1.75 |
| Chlorine | do | .03 |
| Selenium | do | .005 |
| Tellurium | do | .0002 |
| Bismuth | do | .06 |

I then added titanium dioxide dissolved in concentrated sulphuric acid at the rate of 5 grams per liter of electrolyte having a temperature of approximately 135° F. The solution was agitated for nearly one hour and then allowed to stand for approximately three hours, at which time the solution analyzed as follows:

| | |
|---|---|
| Specific gravity | 1.265 |
| $H_2SO_4$ grams per liter | 205 |
| Copper do | 45.9 |
| Nickel do | 12.8 |
| Arsenic do | 2.52 |
| Antimony | Trace |
| Iron do | 1.20 |
| Chlorine do | .03 |
| Selenium | None |
| Tellurium | None |
| Bismuth do | .04 |

As shown from the above table the selenium and tellurium together with practically all of the antimony were precipitated. The iron and bismuth content was materially reduced and arsenic was eliminated to such proportions that the electrolyte was suitable for return to and reuse in the tank house.

The removal of antimony is significant because it normally tends to deposit on the cathode and although it is common practice to prevent this by the addition of chlorine, generally in the form of hydrochloric acid or salt, to the solution, its maximum permissible limit is relatively low and is ordinarily reached quickly even though additions of a chloride are used to overcome its detrimental effect.

It will be noted in the above example that no copper or nickel is removed from the solution. When desired, these elements may be readily decreased by well known methods such as removing the copper by the use of an insoluble anode and subsequently evaporating the electrolyte down to approximately 50° Baumé whereby the nickel is precipitated.

While I prefer to withdraw and separately treat portions of the solution it is, of course, obvious that the titanium sulphate may be added to the electrolyte as an addition agent. However, in such case, the titanium compounds will be lost in the slimes. By recovering the titanium compounds and regenerating titanium sulphate for treatment of subsequent portions of the solution the cost of operation is reduced. This is a comparatively simple process as the arsenic is readily removed from the titanium with a solution of caustic soda or with a solution of sodium sulphide, after which the titanium dioxide may be redissolved in concentrated sulphuric acid for treatment of subsequent portions of the electrolyte.

While I prefer adding the titanium as heretofore described it is to be clearly understood that the invention is not to be so limited. For example, it is possible to add the titanium in the chloride forms. Again, acid cake, containing approximately 30% titanium dioxide, is nearly 90% soluble in hot water and obviously the titanium may be added in this manner. I have also been able to obtain satisfactory results by putting the acid cake directly into the solution or electrolyte being treated and in such cases I have found that temperatures approximating the boiling point give better results than lower temperatures.

As previously indicated it is desirable to agitate the solution being treated after the addition of the titanium in order to thoroughly mix the constituents. This may be accomplished in a variety of ways but I prefer to agitate with air as such treatment aids in oxidizing any iron present.

While certain novel features of the invention have been disclosed and are pointed out in the annexed claims, it will be understood that various omissions, substitutions and changes may be made by those skilled in the art without departing from the spirit of the invention.

What is claimed is:

1. The method of treating a copper electrolyte containing one or more elements of the group comprising arsenic, antimony, iron, selenium and tellurium, which comprises adding to said electrolyte quantities of titanium in such form as will precipitate members of the aforesaid group from said electrolyte.

2. In purifying copper refining electrolytes and leach solutions contaminated with arsenic the improvement which comprises treating such a solution with appropriate quantities of a salt of titanium thereby precipitating arsenic from said solution.

3. The method of eliminating to within workable limits impurities in copper electrolytes and like solutions which comprises subjecting such solutions to the action of titanium dioxide dissolved in concentrated sulphuric acid whereby such impurities are precipitated.

4. In the removal of impurities, such as arsenic, antimony, iron, selenium, tellurium and the like, from acid solutions utilized in copper metallurgical processes, the improvement which comprises precipitating such elements from the solution by means of titanium sulphate.

5. The process for reducing to low limits impurities such as arsenic, antimony, selenium, tellurium and iron in copper refining electrolytes without removing copper and nickel contained therein which comprises treating an electrolyte containing such elements with titanium sulphate at a temperature of about 135° F. for approximately four hours.

6. The process of purifying a copper refining electrolyte containing in addition to copper one or more members of the group comprising nickel, arsenic, antimony, iron, selenium and tellurium, which comprises adding to such electrolyte titanium in a form capable of precipitating any members of the aforesaid group except nickel, agitating the electrolyte, allowing the electrolyte to stand until precipitation reaches a desired point and separating the precipitate from the thus purified electrolyte.

7. The method of reducing the amount of such impurities as antimony, arsenic, iron, selenium and tellurium in a copper refining electrolyte which comprises withdrawing a portion of such solution, agitating same with air in the presence of a titanium salt thereby precipitating such impurities and thereafter returning the purified electrolyte to the system.

EDGAR C. PITZER.